United States Patent
Ryu et al.

(10) Patent No.: US 8,947,457 B2
(45) Date of Patent: *Feb. 3, 2015

(54) METHOD FOR PROVIDING INFORMATION ON OBJECT WHICH IS NOT INCLUDED IN VISUAL FIELD OF TERMINAL DEVICE, TERMINAL DEVICE AND COMPUTER READABLE RECORDING MEDIUM

(71) Applicant: Intel Corporation, Santa Clara, CA (US)

(72) Inventors: Jung Hee Ryu, Seoul (KR); Hana Ryu, Seongnam-si (KR); Kyoung Suk Lee, Seoul (KR); Chan Jin Ju, Seoul (KR); Hae Il Lee, Uijeongbu-si (KR)

(73) Assignee: Intel Corporation, Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/733,382

(22) Filed: Jan. 3, 2013

(65) Prior Publication Data
US 2013/0182011 A1    Jul. 18, 2013

Related U.S. Application Data

(63) Continuation of application No. 13/378,421, filed as application No. PCT/KR2010/009615 on Dec. 31, 2010, now Pat. No. 8,373,725.

(30) Foreign Application Priority Data

Jan. 29, 2010    (KR) ........................ 10-2010-0008588

(51) Int. Cl.
*G09G 5/00*    (2006.01)
*G06T 19/00*    (2011.01)
*G06K 9/00*    (2006.01)

(52) U.S. Cl.
CPC .......... *G06T 19/006* (2013.01); *G06K 9/00671* (2013.01)
USPC ........................................... 345/633; 345/636

(58) Field of Classification Search
USPC .................................................. 345/633, 636
See application file for complete search history.

(56) References Cited

U.S. PATENT DOCUMENTS

2003/0025714 A1    2/2003    Ebersole et al.
2004/0238732 A1    12/2004    State et al.
(Continued)

FOREIGN PATENT DOCUMENTS

KR    10-2009-0106069    10/2009
KR    100975128    8/2010
(Continued)

OTHER PUBLICATIONS

Hile, et al., "Landmark-Based Pedestrian Navigation with Enhanced Spatial Reasoning", In *Proceedings of Pervasive '09 Springer-Verlag*, (2009), 3-4, 9-10.

(Continued)

*Primary Examiner* — Maurice L McDowell, Jr.
(74) *Attorney, Agent, or Firm* — Blakely, Sokoloff, Taylor & Zafman LLP

(57) ABSTRACT

The present invention relates to a method for providing information on an object excluded in a visual field of a terminal in a form of augmented reality (AR) by using an image inputted to the terminal and information related thereto. The method includes the steps of: (a) specifying the visual field of the terminal corresponding to the inputted image by referring to at least one piece of information on a location, a displacement and a viewing angle of the terminal; (b) searching an object(s) excluded in the visual field of the terminal; and (c) displaying guiding information on the searched object(s) with the inputted image in a form of the augmented reality; wherein the visual field is specified by a viewing frustum whose vertex corresponds to the terminal.

15 Claims, 3 Drawing Sheets

(56) References Cited

U.S. PATENT DOCUMENTS

| | | |
|---|---|---|
| 2005/0116964 A1 | 6/2005 | Kotake |
| 2005/0231419 A1 | 10/2005 | Mitchell |
| 2006/0004512 A1 | 1/2006 | Herbst |
| 2007/0162942 A1 | 7/2007 | Hamynen |

FOREIGN PATENT DOCUMENTS

| | | |
|---|---|---|
| WO | WO2006/070047 | 7/2006 |
| WO | WO2009/133988 | 11/2009 |

OTHER PUBLICATIONS

European Supplemental Search Report, EP10844822.6, Nov. 6, 2014 10 pages.

METHOD FOR PROVIDING INFORMATION ON OBJECT WHICH IS NOT INCLUDED IN VISUAL FIELD OF TERMINAL DEVICE, TERMINAL DEVICE AND COMPUTER READABLE RECORDING MEDIUM

The present patent application is a Continuation application claiming priority from application Ser. No. 13/378,421, filed Dec. 15, 2011 which is a National Phase Application of International Application No. PCT/KR2010/009615 filed Dec. 31, 2010 which claims priority from Korean Application No. 10-2010-0008588, filed Jan. 29, 2010.

FIELD OF THE INVENTION

The present invention relates to a method, a terminal and a computer-readable recording medium for providing information on an object excluded in a visual field of a terminal; and more particularly, to the method, the terminal and the computer-readable recording medium for allowing a user to recognize the object excluded in the visual field of the terminal and effectively obtain information on the object by displaying information on existence, location and direction of the object with an image inputted through the terminal in a form of an augmented reality (AR).

BACKGROUND OF THE INVENTION

Recently, due to the wide spread use of the Internet, it has been common to provide geographical information converted to a digital form which was once offered in a form of printing such as books. A digital map service provided online, a navigation system installed in a vehicle, etc. may be examples. As such, one of benefits of the digitalized geographic information is to provide a variety of convenient functions for users through user interfaces capable of allowing the users to retrieve desired geographic information. Further, changes in the geographic information may be easily updated through remote updating services, etc., so that, in the aspect of latest geographic information, such digital data may be predominant over conventional printed materials.

In special, a technology of providing geographical information in a form of augmented reality (AR) which displays supplementary information, including computer graphics (CG), texts, etc., combined on an inputted image taken in real time by a terminal has been recently introduced. According to the AR technology, the technology may provide the geographical information for the user in a more intuitive method because it may offer supplementary information (e.g., a graphic element indicating a point of interest (POI), etc.) which overlaps visually with an inputted image, i.e., an image of the real world the user is watching as being inputted through a camera module of the terminal.

Since a size of a screen, e.g., a liquid crystal display, etc. of a mobile device is not large enough to display a huge amount of information, it is general to limitedly display only supplementary information for an object included in the visual field by using the conventional AR technology and not to display supplementary information for an object excluded therein.

However, according to the existing augmented reality technology, if an object that the user intends to search is not included in the visual field of the terminal, the user must change the terminal's displacement or geographic location in order to include the object in the visual field of the user's terminal. Further, the user may feel inconvenient to search the object because the user cannot get any guidance for a location or a direction of the object while changing the terminal's displacement or geographic location.

Accordingly, the applicant of the present invention came to develop a technology which supports the user to easily recognize the object excluded in the visual field of the terminal and effectively acquire information on the object by displaying information on the object's existence, location and direction with the inputted image.

SUMMARY OF THE INVENTION

It is, therefore, an object of the present invention to solve all the problems mentioned above.

It is another object of the present invention to display information on an object close to a boundary of a visual field of a terminal among objects excluded in the visual field thereof with a displayed inputted image by specifying the visual field thereof corresponding to the image inputted through the terminal and by searching the objects excluded therein in use of information on a location, a displacement and a viewing angle of the terminal.

In accordance with one aspect of the present invention, there is provided a method for providing information on an object excluded in a visual field of a terminal in a form of augmented reality (AR) by using an image inputted to the terminal and information related thereto, including the steps of: (a) specifying the visual field of the terminal corresponding to the inputted image by referring to at least one piece of information on a location, a displacement and a viewing angle of the terminal; (b) searching an object(s) excluded in the visual field of the terminal; and (c) displaying guiding information on the searched object(s) with the inputted image in a form of the augmented reality; wherein the visual field is specified by a viewing frustum whose vertex corresponds to the terminal.

In accordance with another aspect of the present invention, there is provided a method for providing information on an object excluded in a visual field of a terminal in a form of augmented reality (AR) by using an image inputted to the terminal and information related thereto, including the steps of: (a) specifying the visual field of the terminal corresponding to the inputted image by referring to at least one piece of information) on a location, a displacement and a viewing angle of the terminal; (b) searching an object(s) excluded in the visual field of the terminal; and (c) displaying guiding information on the searched object (s) with the inputted image in a form of the augmented reality; wherein the guiding information includes at least one of a string(s) of a name(s) of the searched object(s) and a graphic element(s) representing a relative location(s) thereof compared with a location of the visual field.

In accordance with still another aspect of the present invention, there is provided a terminal for providing information on an object excluded in a visual field thereof in a form of augmented reality (AR) by using an image inputted thereto and information related thereto, including: a location and displacement measuring part for specifying the visual field thereof corresponding to the inputted image by referring to at least one piece of information on a location, a displacement and a viewing angle thereof; an information searching part for searching an object(s) excluded in the visual field thereof; and a user interface part for displaying guiding information on the searched object(s) with the inputted image in a form of the augmented reality; wherein the visual field is specified by a viewing frustum whose vertex corresponds thereto.

In accordance with still another aspect of the present invention, there is provided a terminal for providing information on an object excluded in a visual field thereof in a form of augmented reality (AR) by using an image inputted therein and information related thereto, including: a location and displacement measuring part for specifying the visual field thereof corresponding to the inputted image by referring to at least one piece of information on a location, a displacement and a viewing angle thereof; an information searching part for searching an object(s) excluded in the visual field thereof; and a user interface part for displaying guiding information on the searched object(s) with the inputted image in a form of the augmented reality; wherein the guiding information includes at least one of a string(s) of a name(s) of the searched object(s) and a graphic element(s) representing a relative location(s) thereof compared with a location of the visual field.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
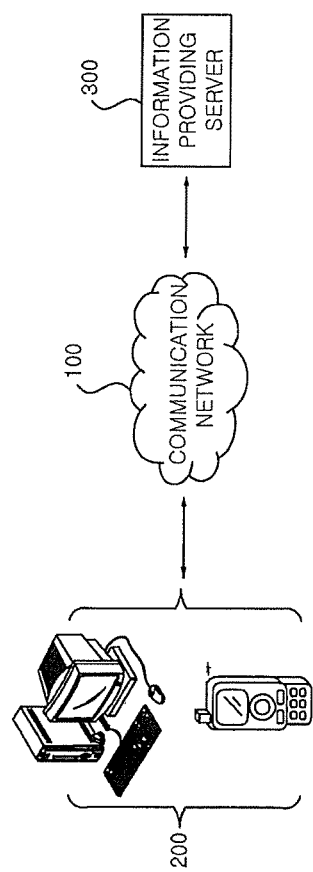
FIG. 1 is a diagram which briefly presents a configuration of an entire system to provide information on an object excluded in a visual field of a terminal in accordance with an example embodiment of the present invention.

The detailed description of the present invention illustrates particular embodiments in which the present invention can be performed with reference to the attached drawings.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Configuration of Entire System

FIG. 1 briefly presents a configuration of an entire system for providing information on an object excluded in a visual field of a terminal in accordance with an example embodiment of the present invention.

As illustrated in FIG. 1, the entire system in accordance with an example embodiment of the present invention may include a communication network 100, a terminal 200, and an information providing server 300.

First, the communication network 100 in accordance with an example embodiment of the present invention may be configured, regardless of wired or wireless, in a variety of networks, including a telecommunication network, a local area network (LAN), a metropolitan area network (MAN), a wide area network (WAN), an artificial satellite network, etc. More preferably, the communication network 100 in the present invention must be understood to be a concept of networks including the World Wide Web (www), CDMA (Code Division Multiple Access), WCDMA (Wideband Code Division Multiple Access) or GSM (Global System for Mobile Communications).

Next, the terminal 200 in accordance with an example embodiment of the present invention may perform a function of displaying information on an object excluded in a visual field of the terminal 200 in a form of augmented reality (AR) by using an image inputted through a photographing instrument, e.g., a camera, included in the terminal 200 and information related to the inputted image, i.e., the object. In accordance with the present invention, the terminal 200 may be a digital device which includes a function to allow the user to access to, and then communicate with, the communication network 100. Herein, the digital device, such as a personal computer (e.g., desktop, laptop, tablet PC, etc.), a workstation, a PDA, a web pad, and a cellular phone, which has a memory means and a micro processor with a calculation ability, may be adopted as the terminal 200 in accordance with the present invention. An internal configuration of the terminal 200 will be explained later.

In accordance with an example embodiment of the present invention, the information providing server 300 may perform a function of providing various kinds of information at a request of the terminal 200 by communicating with the terminal 200 and another information providing server (non-illustrated) through the communication network 100. More specifically, the information providing server 300, which includes a web content search engine (non-illustrated), may search information corresponding to the request of the terminal 200 and provide the search result to allow a user of the terminal 200 to browse. For example, the information providing server 300 may be an operating server of an Internet search portal and the information provided for the terminal 200 may be various types of information on websites, web documents, knowledge, blogs, communities, images, videos, news, music, shopping, maps, books, movies, etc. Of course, the search engine of the information providing server 300, if necessary, may be included in a different computing device or a recording medium.

Configuration of Terminal

Below is an explanation on an internal configuration and components of the terminal 200 which perform their important functions for implementing the present invention.

Figure 2:
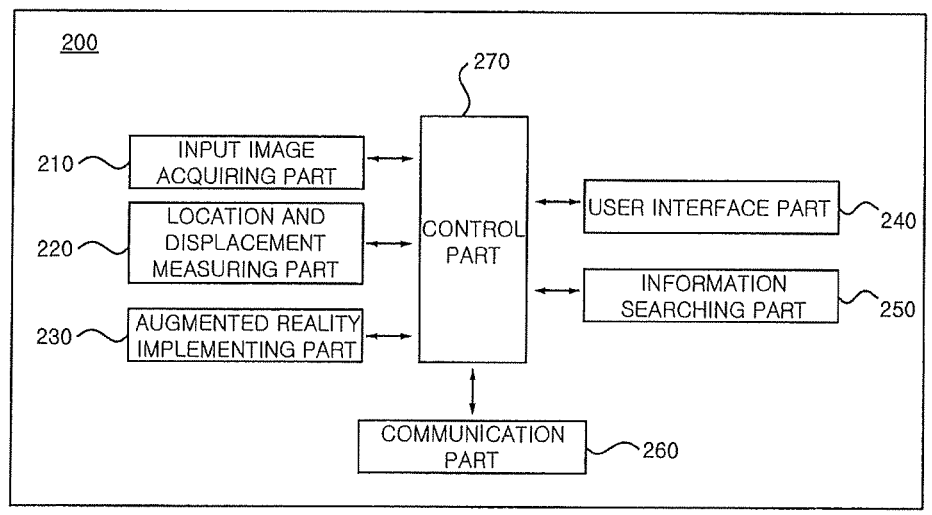
FIG. 2 is a diagram which exemplarily shows an internal configuration of a terminal 200 in accordance with an example embodiment of the present invention.

FIG. 2 exemplarily represents the internal configuration of the terminal 200 in accordance with an example embodiment of the present invention.

By referring to FIG. 2, the terminal 200 in accordance with an example embodiment of the present invention may include an input image acquiring part 210, a location and displacement measuring part 220, an augmented reality implementing part 230, a user interface part 240, an information searching part 250, a communication part 260 and a control part 270. In accordance with an example embodiment of the present invention, at least some of the input image acquiring part 210, the location and displacement measuring part 220, the augmented reality implementing part 230, the user interface part 240, the information searching part 250, the communication part 260 and the control part 270 may be program modules communicating with the user terminal 200. The program modules may be included in the terminal 200 in a form of an operating system, an application program module and other program modules and may also be stored on several memory devices physically. Furthermore, the program modules may be stored on remote memory devices communicable to the terminal 200. The program modules may include but not be subject to a routine, a subroutine, a program, an object, a component, and a data structure for executing a specific operation or a type of specific abstract data that will be described in accordance with the present invention.

First, the input image acquiring part 210 in accordance with an example embodiment of the present invention may perform a function of acquiring an inputted image used as a basis of augmented reality implemented by the augmented reality implementing part 230, which will be explained later. More specifically, the input image acquiring part 210 in accordance with an example embodiment of the present invention may include a photographing instrument such as a CCD camera and conduct a function of receiving landscape appearance around a user, who holds the terminal 200, in real time in a preview state.

To determine to which region of the real world the inputted image acquired by the terminal 200 corresponds, the location and displacement measuring part 220 in accordance with an example embodiment of the present invention may carry out a function of measuring a location and a displacement of the terminal 200.

More precisely, the location and displacement measuring part 220 in accordance with an example embodiment of the present invention may measure the location of the terminal 200 by using technologies for acquiring location information such as GPS (Global Positioning System) or mobile communications technology. For example, the location and displacement measuring part 220 may include a GPS module or a mobile communications module. In addition, the location and displacement measuring part 220 in accordance with an example embodiment of the present invention may measure the displacement of the terminal 200 by using a sensing means. For instance, the location and displacement measuring part 220 may include an accelerometer for sensing a moving distance, a velocity, a moving direction, etc. of the terminal 200 and a gyroscope for sensing a rotation rate, an angular velocity, an angular acceleration, a direction, etc. of the terminal 200.

In addition, the location and displacement measuring part 220 in accordance with an example embodiment of the present invention may perform a function of specifying the visual field of the terminal 200 corresponding to the image inputted therethrough, based on a visual point, i.e., a location of a lens of the terminal 200, by referring to information on the location, the displacement, and the view angle of the terminal 200 measured as shown above.

More specifically, the visual field of the terminal 200 in accordance with an example embodiment of the present invention means a three-dimensional region in the real world and it may be specified as a viewing frustum whose vertex corresponds to the terminal 200. Herein, the viewing frustum indicates the three-dimensional region included in a visual field of a photographing instrument, such as a camera, if an image is taken by the photographing instrument or inputted in a preview state therethrough. It may be defined as an infinite region in a shape of a cone or a polypyramid according to types of photographing lenses (or as a finite region in a shape of a trapezoidal cylinder or a trapezoidal polyhedron created by cutting the cone or the polypyramid by a near plane or a far plane which is vertical to a visual direction, i.e., a direction of a center of the lens embedded in the terminal 200 facing the real world which is taken by the lens, the near plane being nearer to the visual point than the far plane) based on the center of the lens serving as the visual point. With respect to the viewing frustum, the specification of Korean Patent Application No. 2010-0002340 filed by the applicant of the present invention may be referred to. The specification must be considered to have been combined herein.

Furthermore, the augmented reality implementing part 230 in accordance with an example embodiment of the present invention may perform a function of implementing augmented reality by combining the inputted image acquired by the terminal 200 and the information relating to the inputted image to thereby generate an output image visually expressed in a form of the augmented reality. For instance, the augmented reality implementing part 230 in accordance with an example embodiment of the present invention may display a graphic element indicating a point of interest (POI) of an object (e.g., a building, a store, etc.), considered to be included in the visual field of the terminal 200, as the information relating to the inputted image and provide more detailed information on the object if the point of interest is selected by the user. For another example, the augmented reality implementing part 230 in accordance with an example embodiment of the present invention may implement the augmented reality by displaying the inputted image overlapped with a semitransparent two-dimensional map for displaying the location of the object around a place where the terminal 200 is located or with a semitransparent information window including information on the weather of the place of the terminal 200.

To implement the augmented reality by using the inputted image acquired by the terminal 200 and the information relating to the inputted image, the user interface part 240 in accordance with an example embodiment of the present invention, additionally, may perform a function of displaying guiding information on an object excluded in the visual field of the terminal 200 with the inputted image. More specifically, the user interface part 240 in accordance with an example embodiment of the present invention may display, with the inputted image, the guiding information that informs an existence, a location, a direction, etc. of the object searched as that excluded in the visual field of the terminal 200. For this, a process for searching the object excluded in the visual field of the terminal 200 must be preceded by referring to the information on the visual field of the terminal 200 and the location of the object existing in the real world. This may be performed by the information searching part 250, which will be explained later.

Herein, the guiding information displayed in addition to the inputted image in accordance with an example embodiment of the present invention may include a string displaying a name of the object, a graphic element which represents a relative location of the object compared with a location of the visual field of the terminal 200, etc. However, it is made clear that the guiding information in accordance with the present invention is not limited only to the items listed above and other items suggesting or guiding the existence, the location, the direction, etc. of the object excluded in the visual field of the terminal 200 may be included in the guiding information in accordance with the present invention.

In accordance with an example embodiment of the present invention, the user interface part 240 may also perform a function of displaying more detailed information on the object if the guiding information displayed with the inputted image is selected by the user.

More specifically, the user interface part 240 in accordance with an example embodiment of the present invention may carry out a function of adaptively deciding a location on the screen where the guiding information on the object is displayed by referring to a real location of the object, i.e., a relative location of the object compared with the location of the visual field of the terminal 200. For example, it may be assumed that a tourist attraction A excluded in the visual field of the terminal 200 is located on the right side of the visual field. In the case, the user interface part 240 in accordance with an example embodiment of the present invention may display the guiding information on the tourist attraction A on the right portion of the inputted image.

More specifically, the user interface part 240 in accordance with an example embodiment of the present invention may carry out a function of differentially displaying the guiding information on the object excluded in the visual field of the terminal 200 according to the proximity to the boundary of the visual field of the terminal 200. For instance, it may be assumed that the guiding information on a building A which might be included in the visual field of the terminal 200 if the terminal 200 rotates to the right by 15 degrees and a building B which might be included therein if it rotates to the same direction by 30 degrees. In the case, the building A may be evaluated to be closer to the boundary of the visual field of the terminal 200 than the building B. Accordingly, the user interface part 240 in accordance with an example embodiment of the present invention may allow the guiding information on the building A to be displayed larger than that on the building B in the output image, allow the latter information to be displayed farther right than the former information on a screen or allow only the former information to be displayed in the output image, etc.

Figure 3:
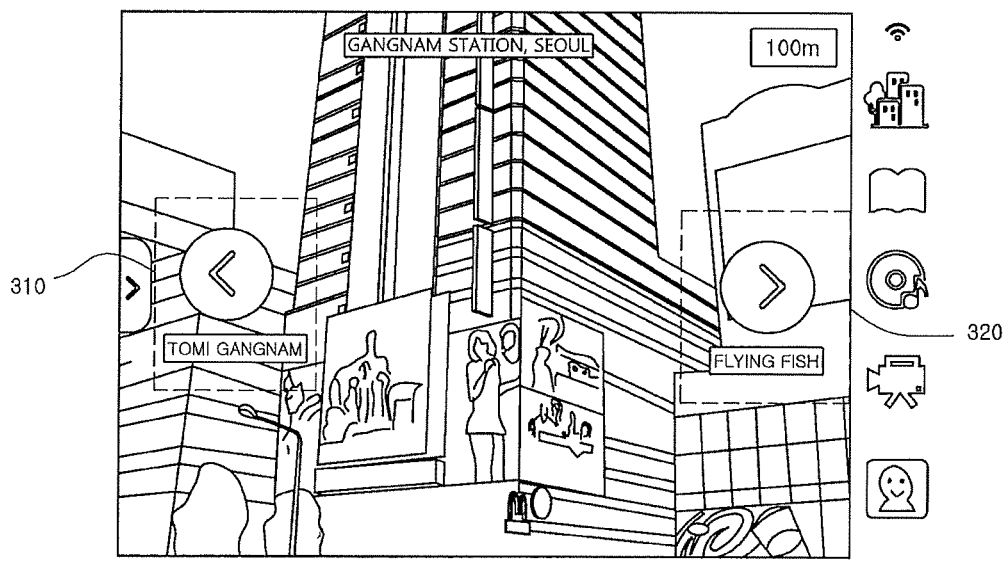
FIG. 3 is a drawing exemplarily illustrating a configuration which provides guiding information on the object excluded in the visual field of the terminal in accordance with an example embodiment of the present invention.

FIG. 3 is a drawing exemplarily illustrating a configuration which provides the guiding information on the object excluded in the visual field of the terminal in accordance with an example embodiment of the present invention.

By referring to FIG. 3, a configuration capable of allowing guiding information 301 and 320 on the object excluded in the visual field of the terminal 200 to be displayed in the output image in a form of augmented reality may be confirmed in accordance with an example embodiment of the present invention. More specifically, it may be found that first guiding information 310 for guiding a restaurant called "TOMI Gangnam" located on the left out of the output image based on the visual field of the terminal 200 includes a string indicating the name of the restaurant and a single arrow guiding its relative location and second guiding information 310 for guiding a store named "Flying Fish" on the right out of the output image based on the visual field of the terminal 200 includes a string indicating the name of the store and a single arrow guiding its relative location.

In accordance with an example embodiment of the present invention, information on other images as well as the information on the output image implemented in the augmented reality may be visually expressed through the terminal 200's display part (non-illustrated). For example, the display part in accordance with an example embodiment of the present invention may be a flat-panel display including an LCD (Liquid Crystal Display) or an OLED (Organic Light Emitting Diodes).

Furthermore, the information searching part 250 in accordance with an example embodiment of the present invention may conduct a function of searching the object excluded in the visual field of the terminal 200 by referring to its visual field and information on the location of the object in the real world.

In addition, the information searching part 250 in accordance with an example embodiment of the present invention may perform a function of searching necessary information by communicating with the information providing server 300 in order to provide a response to a query inputted through the terminal 200. For instance, on assumption that information on a store A is inputted as a query through the terminal 200, the information searching part 250 in accordance with an example embodiment of the present invention may conduct a function of searching information on the store A's location, telephone number, products, reviews, etc. by accessing to an information search portal server and allow at least some searched information to be provided to the terminal 200.

Moreover, the communication part 260 in accordance with an example embodiment of the present invention may perform a function of allowing the terminal 200 to communicate with an external device such as the information providing server 300.

Lastly, the control part 270 in accordance with an example embodiment of the present invention may control the flow of the data among the input image acquiring part 210, the location and displacement measuring part 220, the augmented reality implementing part 230, the user interface part 240, the information searching part 250 and the communication part 260. In other words, the control part 270 may control the flow of data from outside or among the components of the terminal 200 to thereby force the input image acquiring part 210, the location and displacement measuring part 220, the augmented reality implementing part 230, the user interface part 240, the information searching part 250 and the communication part 260 to perform their unique functions.

In accordance with the present invention, it is possible to display the information on the object adjacent to the boundary of the terminal's visual field among objects excluded therein in a form of the augmented reality. Therefore, it may be able to allow the user to, easily recognize the existence, the location and the direction of the object and effectively acquire its information.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method comprising:
   specifying a visual field of a terminal corresponding to an inputted image by referring to information on a location, a displacement and a viewing angle of the terminal, the visual field specified by a viewing frustum having vertex that corresponds to the terminal;
   searching an object excluded in the visual field of the terminal;
   displaying guiding information on the object with the inputted image in a form of augmented reality; and
   displaying a location by referring to a relative location of the object with reference to a location of the visual field.

2. The method of claim 1, wherein the guiding information includes a string of a name of a searched object.

3. The method of claim 1, wherein the guiding information includes a graphic element representing the relative location of the object with reference to the location of the visual field.

4. A terminal comprising:
   a location and displacement measuring component to specify a visual field corresponding to an inputted image by referring to information on a location, a displacement and a viewing angle;
   an information searching part to search an object excluded in the visual field; and
   a display device to display guiding information for the object with the inputted image in a form of the augmented reality and display a location by referring to a relative location of the object with reference to a location of the visual field.

5. The terminal of claim 4, wherein the visual field is specified by a viewing frustum having a vertex that corresponds to the terminal.

6. The terminal of claim 4, wherein the guiding information includes a string of a name of a searched object.

7. The terminal of claim 4, wherein the guiding information includes a graphic element representing the relative location of the object with reference to the location of the visual field.

8. The terminal of claim 4, wherein the guiding information is displayed differentially according to a degree of proximity to a boundary of the visual field.

9. A method comprising:
   specifying a visual field of a terminal corresponding to an inputted image by referring to information on a location, a displacement and a viewing angle of the terminal, the visual field specified by a viewing frustum having vertex that corresponds to the terminal;
   searching an object excluded in the visual field of the terminal; and
   displaying guiding information on the object with the inputted image in a form of augmented reality differentially according to a degree of proximity to a boundary of the visual field.

10. The method of claim 9, wherein the guiding information includes a string of a name of a searched object.

11. The method of claim 9, wherein the guiding information includes a graphic element representing the relative location of the object with reference to the location of the visual field.

12. A non-transitory medium having a computer readable program to execute a process comprising:
   specifying a visual field of a terminal corresponding to an inputted image by referring to information on a location, a displacement and a viewing angle of the terminal, the visual field specified by a viewing frustum having vertex that corresponds to the terminal;
   searching an object excluded in the visual field of the terminal; and
   displaying guiding information on the object with the inputted image in a form of augmented reality differentially according to a degree of proximity to a boundary of the visual field.

13. The medium of claim 12, wherein the guiding information includes a string of a name of a searched object.

14. The medium of claim 12, wherein the guiding information includes a graphic element representing the relative location of the object with reference to the location of the visual field.

15. The medium of claim 12, wherein displaying the guiding information further comprises displaying a location by referring to a relative location of the object with reference to a location of the visual field.

* * * * *